Jan. 10, 1967 R. E. MATICK 3,298,005

THICK FILM READ-ONLY MEMORY

Original Filed Dec. 14, 1961

INVENTOR.
RICHARD E. MATICK

BY

S. P. Tedesco

ATTORNEY

United States Patent Office 3,298,005
Patented Jan. 10, 1967

3,298,005

THICK FILM READ-ONLY MEMORY

Richard E. Matick, Peekskill, N.Y., assignor to International Business Machines Corporation, New York, N.Y., a corporation of New York Continuation of application Ser. No. 159,342, Dec. 14, 1961. This application Jan. 3, 1966, Ser. No. 518,257
30 Claims. (Cl. 340—174)

This invention relates to read-only memory devices and, more particularly, to read-only memory devices employing thick magnetic films having uniaxial anisotropic characteristics as storage elements as described in the copending United States patent application, Serial No. 159,342, to which this application is related as a continuation, now abandoned.

A read-only memory device may be defined as one wherein information is stored either on a permanent or semi-permanent basis and is continuously available on a nondestructive readout basis. Read-out memories, for example, find application in high performance computers to store information which is required to be changed relatively infrequently, e.g., programs, statistical data, statistical tables, etc. The use of read-only memories is preferred due to their inherent faster cycle time, more simplified construction and lower cost as compared with corresponding memories of the read-write type.

Due to the fast speed requirements of present day computers, extensive efforts have been directed toward the development of magnetic films as possible storage devices for memory application. Essentially, magnetic films are layers of magnetic materials deposited onto a substrate in the presence of a static magnetic field applied parallel to the substrate plane. Such films, for example, may be formed of a Permalloy material comprising 80% nickel (Ni) and 20% iron (Fe). The static magnetic field induces a preferred "easy" direction of magnetization aligned with the applied magnetic field and a resultant "hard" direction of magnetization displaced 90° from this induced "easy" direction of magnetization. A magnetic film exhibiting an "easy" and a "hard" direction, or axis, of magnetization in the absence of an applied magnetic field is said to exhibit unixial anisotropic characteristics.

Generally, magnetic films heretofore considered suitable for memory applications have been those bearing an inherent self-demagnetizing force less than the inherent coercive force. Such films, hereinafter designated as thin magnetic films, behave as single domains having their magnetization poled in either direction along the "easy" axis to define stable binary states. Thin magnetic films possess excellent switching and storage properties superior in many ways to those of other present day memory devices. However, when the inherent self-demagnetizing force exceeds the inherent coercive force, such films, hereinafter designated as thick magnetic films, disintegrate into several domains, the respective magnetizations of adjacent domains being aligned in parallel but opposite directions along the "easy" axis. This disintegration into multiple domains is primarily due to large demagnetizing forces inherent in thicker magnetic films and the films are ineffectual to define two distinct stable binary states. This inability to define stable binary states has precluded consideration of thick magnetic films for memory applications albeit such films, when compared with thin magnetic films, are easier to fabricate and provide larger flux reversals when switched.

However, in accordance with the principles of this invention, thick magnetic films can be advantageously employed as storage devices in read-only memory devices, and provide a faster cycle time than if thin magnetic films were similarly employed. This result is achieved by taking full advantage of the anisotropic and large demagnetization forces inherent in thick magnetic films, the very properties which have heretofore precluded their use for memory applications.

One object of this invention is to provide a read-only memory employing thick magnetic films as the basic storage element.

Another object of this invention is to provide a read-only memory which has a very fast cycle time and which is simple to fabricate and reliable in operation.

Briefly, and in accordance with the principles of this invention, these and numerous other objects and advantages in read-only memory devices are attained by employing thick magnetic films as storage elements wherein a second stable binary state, albeit semi-permanent, is established in selected ones of said films by the application of external biasing fields. The external biasing fields are of sufficient magnitude to overcome the inherent anisotropic and large demagnetizing forces so as to saturate and align the magnetization of the multiple domains in the selected thick magnetic films along the "hard" axis. To readout the read-only memory, a pulsed magnetic field is applied perpendicular to the "easy" axis of a thick magnetic film. The magnetization of the multiple domains in saturated thick magnetic films is unaffected; however, the magnetization of the multiple domains in unsaturated thick magnetic films is rotated so as to be substantially aligned along the "hard" axis. During the readout process, a sensing of the rotation or absence of rotation of multiple domains in unsaturated and saturated thick magnetic films, respectively, is indicative of a particular binary quantity.

It is well known that the cycle time or information bit rate of a memory device is equal to the switching time plus relaxation time of the particular storage element employed. In the case of magnetic films, the relaxation time is that time required for the magnetization of either the single or multiple domains to realign along the "easy" axis upon having been rotated therefrom during the readout process. Although slightly larger driving fields are required to achieve a given switching time than required with thin magnetic films, the anisotropic and large demagnetization forces inherent in thick magnetic films accelerate realignment of the magnetization of the multiple domains so as to achieve cycle time orders of magnitude faster than if thin magnetic films were similarly employed.

The foregoing and other objects, features and advantages of the invention will be apparent from the following more particular description of a preferred embodiment of the invention, as illustrated in the accompanying drawings.

Figure 1:
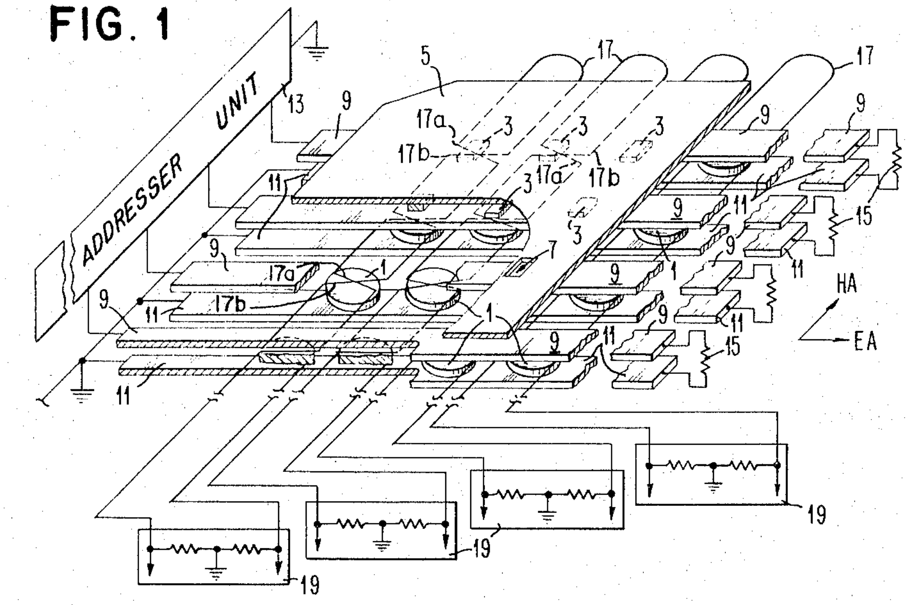
FIG. 1 shows an isometric, partially exposed view of a two-dimensional read-only memory device wherein thick magnetic films are employed as storage elements.
Figure 4A:
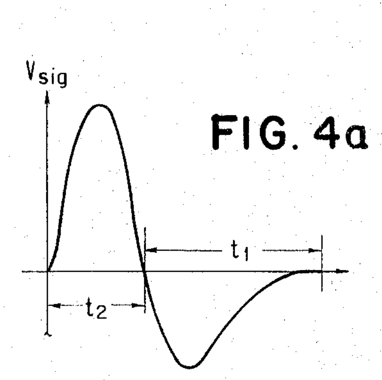
Figure 4B:
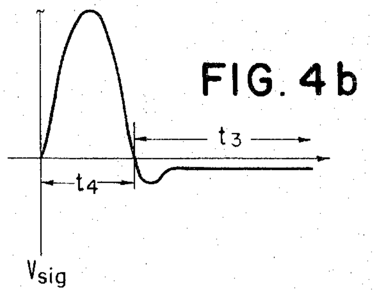

FIGS. 4*a* and 4*b*, respectively, depict output signals developed during the readout process when thick magnetic films and thin magnetic films are employed as storage elements in the read-only memory device of FIG. 1 to illustrate the more rapid relaxation time of thick magnetic films as compared with thin magnetic films.

Figure 5:
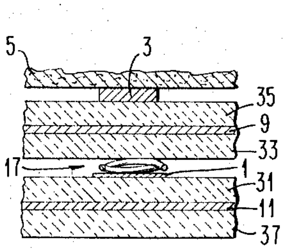

FIG. 5 is a cross-sectional, exaggerated view of a single thick magnetic film arrangement comprising a memory cell of the read-only memory of FIG. 1.

Figure 2:
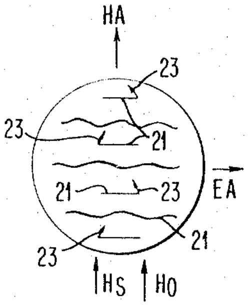
FIG. 2 illustrates the multiple domain structure of thick magnetic films and the parallel but opposite alignment of the magnetization of adjacent domains along the "easy" axis.
Figure 3:
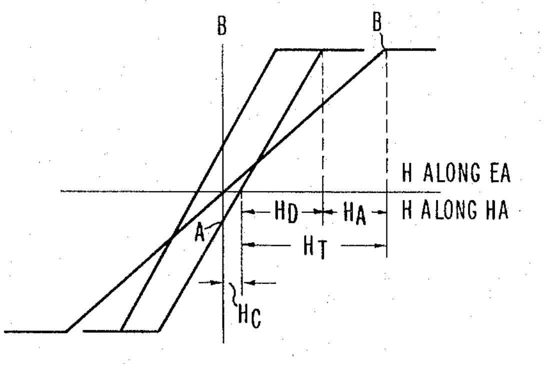
FIG. 3 shows hysteresis curves of a thick magnetic film along the "easy" axis and the "hard" axis.

To more fully understand the read-only memory of this invention, reference is initially made to FIGS. 2 and 3 which illustrate the multiple domain structure and the characteristics of a thick magnetic film 1, respectively, employed as a storage element in the read-only memory of FIG. 1, hereinafter described. As previously indicated, anisotropic force $H_A$ is induced along the "hard" axis, indicated by the arrow HA, of magnetic films deposited onto a substrate in the presence of a static magnetic field which tends to maintain magnetization aligned along a preferred or "easy" axis of magnetization, indicated by the arrow EA. In addition, the deposited films are characterized by a coercive force $H_C$ along the "easy" axis. However, as the thickness of the deposited magnetic film is increased while maintaining the area constant, a self-demagnetizing force $H_D$ is built up within the film. For a circular bit, the self-demagnetizing force in oersteds at the center of the magnetic film is approximately given by $$H_D = \frac{B_S T 10^{-7}}{32D}$$

where T is thickness in Angstroms, D is diameter in inches, and $B_S$ is the saturation flux density in gauss. In the absence of a static magnetic field and when the demagnetization force $H_D$ exceeds the coercive force $H_C$, the magnetic film tends to disassociate into multiple domains which align in parallel but opposite directions along the "easy" axis EA, as indicated by arrows 21. The demagnetization force $H_D$ built up within the magnetic film, therefore, effectively overcomes the coercive force $H_C$ so as to establish the multiple domains in a minimum energy state whereat the forces $H_D$ and $H_C$ are equal and remanent magnetization along the "easy" axis is minimized, as indicated at point A. The characteristic curve of the thick magnetic film along the "easy" axis EA, therefore, is canted toward the "hard" axis HA, as illustrated in FIG. 3. It is to be noted that the demagnetization force $H_D$ is at a minimum, i.e., equal to the coercive force $H_C$, and the anisotropic force $H_A$ is zero along the "easy" axis EA in the absence of an external magnetic field. A fuller appreciation of the characteristics of thick magnetic films may be had upon a comparison with those of a thin magnetic film, i.e., wherein the demagnetization force $H_D$ is less than the coercive force $H_C$, as shown in FIG. 20 of "Computer Memories, A Survey of the State-of-the Art," by J. A. Rajchman, Proceedings of the IRE, January 1961, p. 119.

When an external magnetic field $H_O$ is applied transverse to the "easy" axis EA of the thick magnetic film, the magnetization of adjacent domains is caused to rotate in clockwise and counter-clockwise directions, respectively, as indicated by arrows 23. The external magnetic field $H_O$, therefore, induces the magnetization of each of the domains to align in parallel and in a same direction along the "hard" axis HA. Therefore, we can consider a thick magnetic film when operated along the "hard" axis HA as being characterized by the hysteresis curve in the same direction as shown in FIG. 3 and canted toward the point B since domain rotation and sensing of such rotation, as hereinafter described, is effected along the "hard" axis. When magnetization of the multiple domains is rotated toward the "hard" axis HA by the externally applied magnetic field $H_O$, the demagnetization force $H_D$ and also the anisotropic force $H_A$ each increase as a function of the angular deviation of the domains from the "easy" axis EA. Accordingly, when the multiple domains are aligned along the "hard" axis HA, the total normalizing force $H_T$ tending to reorient the domains along the "easy" axis EA is at a maximum. This total normalizing force $H_T$ is equal to the effective demagnetization force $H_D$ plus the anisotropic force $H_A$ of the thick magnetic film. The anisotropic force $H_A$ is defined in FIG. 3 as the total normalizing force $H_T$ less the demagnetization force $H_D$. Accordingly, the alignment of domains along the "hard" axis HA is an unstable state which is stabilized to define a second binary state by saturation of the thick magnetic film, for example, by an external biasing field $H_S$ supplied by a permanent magnet 3 of FIG. 1, hereinafter described. In the absence of an external biasing field $H_S$, the demagnetization force $H_D$ and the anisotropic force $H_A$ tend to realign the individual domains along the "easy" axis EA.

The internal forces which tend to reorient the magnetization of thick magnetic films along the "easy" axis EA, therefore, are substantially greater than those present in thin magnetic films by an amount equal to the demagnetization force $H_D$ inherent in the former. In thin magnetic films, only the presence of an anisotropic force $H_A$ is effective to reorient the single domain magnetization along the "easy" axis EA once displaced therefrom. It is this demagnetization force $H_D$ along with the anisotropic force $H_A$ inherent in thick magnetic films which are utilized to full advantage to provide a very fast cycle time to the read-only memory of FIG. 1 by accelerating reorientation of the multiple domains along the "easy" axis EA subsequent to each readout cycle, hereinafter described.

Referring now to FIG. 1, a two-dimensional read-only memory in accordance with the principles of this invention comprises a plurality of thick magnetic film elements 1 selectively arranged in rows and columns so as to define a plurality of distinct word addresses. While only a portion of the read-only memory is shown, this portion may be extended to include any practical number of word addresses having any desired number of information bit slots as will be obvious to one skilled in the art.

Information is stored in the read-only memory device by applying external biasing fields on a semi-permanent basis to saturate particular ones of the thick magnetic films 1. As shown, these external biasing fields are supplied by a plurality of permanent magnets 3 supported on an "I.B.M."-type card 5 in rows and columns corresponding to the array of thick magnetic films 1. When the card 5 is properly positioned, each permanent magnet 3 is supported in close proximity to a corresponding thick magnetic film 1 to apply a biasing field $H_S$ perpendicular to the "easy" axis EA to saturate the corresponding thick magnetic film 1 along the "hard" axis HA. These permanent magnets 3 may be formed, for example, of very thin (3–5 mils) rubber base permanent magnets. The strength of the applied biasing field is sufficient to overcome the anisotropic force $H_A$ and large demagnetization force $H_D$ inherent in a thick magnetic film 1 to define a first binary state, i.e., one wherein the multiple domains are aligned in the same direction along the "hard" axis HA. It is to be noted, however, that this first binary state might be defined by saturation of a thick magnetic film 1, for example, along the "easy" axis EA. In the absence of a permanent magnet at a particular position on the card 5, for example, as indicated at 7, the multiple domains of a correspondingly positioned thick magnetic film 1 are normally aligned in parallel but opposite directions along the "easy" axis EA to define a second binary state. This last-defined state is one towards which the magnetization of the multiple domains of the thick magnetic film 1 necessarily gravitates in the absence of the external biasing field $H_S$.

The arrangement of the magnets 3 to store particular information at particular word addresses in the memory array is easily obtained by using card punch techniques to selectively remove magnets from the card 5; moreover, information stored in the memory array is conveniently and rapidly changed by the substitution of cards 5 having predetermined arrangements of permanent magnets 3. Cards 5 may be accurately positioned by proper guides and stops, not shown, which will be obvious to one skilled in the art.

The thick magnetic films 1 comprising each word address of the memory array are positioned between a pair of parallel, strip line conductors 9 and 11. Each thick magnetic film 1 is positioned such that its "easy" axis EA is parallel to the length of the corresponding pair of strip line conductors 9 and 11. The upper strip line conductors 9 are connected to an addresser unit 13, the corresponding end of the other strip line conductor 11 is returned to ground so as to define a strip transmission line terminated into its characteristic impedance by a resistor 15. The addresser unit 13, which may be of a conventional type, directs interrogation pulses along particular ones of the strip line conductors 99 and 11 so as to generate magnetic fields perpendicular to the "easy" axis EA. Accordingly, the multiple domains of interposed thick magnetic films 1 are rotated into the "hard" axis HA.

A plurality of sense loops 17 corresponding to the information bit slots in each word address are interposed between the pairs of strip line conductors 9 and 11 and juxtaposed with corresponding thick magnetic films 1. Each sense loop 17 is formed of a very thin wire arranged in squared figure-eight configuration such that two segments 17*a* and 17*b* are inductively coupled in opposite phase relationship along the "hard" axis HA of corresponding thick magnetic films 1 so as to achieve a maximum output indication upon domain rotation. Also, it is preferred that the plane of the sense loops 17 be parallel to and midway between the strip line conductors 9 and 11 so as to avoid mutual inductive coupling and be in a plane of constant potential to minimize capacitive effects to strip line conductors 9 and 11 and sense loops 17. Sense loops 17 are connected to differential amplifiers 19, respectively, which may be of conventional type. Differential amplifiers 19 effectively eliminate noise which might be generated in sense loops 17 during the readout cycle, e.g., due to coupling between sense loops 17 and strip line conductors 9 and 11. However, if strobing techniques are employed, conventional means may be substituted in lieu of differential amplifiers 19 to achieve a same result.

In the fabrication of the read-only memory of this invention, dielectric layers are employed between the thick magnetic films 1, the strip line conductors 9 and 11, and the sense loops 17. As shown in FIG. 5, the read-only memory may be fabricated by depositing thick magnetic films 1 having predetermined geometry onto a glass substrate 31. For example, the thick magnetic films 1 can be deposited in circular form having a diameter of approximately 1/16 of an inch and a thickness of 4000–7000° A. The sense loops 17, on the other hand, can be preformed and cemented onto a second glass substrate 33 and positioned directly over the thick magnetic films 1. The strip line conductors 9 and 11 are either deposited or cemented onto opposite faces of the glass substrates so as to be aligned above and below the particular thick magnetic films 1 comprising the various word addresses of the read-only memory device. The respective thickness of the glass substrates 31 and 33 are such that sense loops 17 are interposed equidistant between the strip lines 9 and 11. Additional glass substrates 35 and 37 are positioned over so as to protect the strip lines 9 and 11, respectively.

To read information from a particular word address of the memory array of FIG. 1, addresser 13 directs an interrogation pulse along the corresponding pair of strip line conductors 9 and 11. Accordingly, a resultant magnetic field $H_O$ rotates the magnetization of the multiple domains in the interpositioned thick magnetic films 1 into the "hard" direction HA. Saturated thick magnetic films 1, i.e., having domains aligned along the "hard" axis HA, are unaffected by the magnetic field $H_O$ and no output pulse is induced along the corresponding sense loop 17. However, in the case of unsaturated ones of the thick magnetic films 1, the applied magnetic field $H_O$ rotates domain magnetization of the multiple domains into the "hard" axis HA so as to induce an output pulse directed along the corresponding sense loop 17 to the respective differential amplifier 19.

While the demagnetization field $H_D$ and along with the anisotropic force $H_A$ do necessitate larger driving fields $H_O$ to achieve a given switching time than required with thin magnetic films, such forces do accelerate the realignment of the individual domains upon cessation of the external magnetic field $H_O$ so as to reduce the relaxation time of memory by orders of magnitude over that of thin magnetic films. For example, as illusrtated in FIG. 4*a*, the relaxation time $t_1$ of thick magnetic films is only slightly greater than the switching time $t_2$ required to rotate the domains from the "easy" axis EA to the "hard" axis HA upon application of an external magnetic field $H_O$. In the case of thin magnetic films, however, the relaxation time $t_3$ is substantially greater than the switching $t_4$ due to the inherent property of thin magnetic films when aligned along a "hard" direction to partially disassociate into numerous domain segments. These domain segments when formed tend to counterbalance and cancel a portion of the anisotropic force $H_A$ which is the sole resetting force present in the thin magnetic films and greatly extend the relaxation time of the thin magnetic films. The presence of these domain segments, therefore, establishes a quasi stable state for the thin magnetic films along the "hard" axis. A switching of thin magnetic films prior to the effective cancellation of these domain segments cannot be effected without greatly sacrificing the magnitude of the output pulse induced along the sense loops. As illustrated in FIG. 4*b*, the negative portion of the curve descriptive of the presence of domain segments in a thin magnetic film is greatly exaggerated for purposes of illustration. Accordingly, when thin magnetic films are employed, relaxation time is minimized either by applying a magnetic field perpendicular to the "hard" axis HA subsequent to the readout process, somewhat analogous to a write-in operation, such as to realign the single domain along the "easy" axis EA or to only partially switch the film during a readout operation to a degree below that at which these domain segments form. It is evident that this latter method necessarily limits permissible flux reversal so as to reduce the magnitude of output pulse. Thick magnetic films, on the other hand, may be fully saturated without formation of domain segments so as to achieve maximum output signal level.

While the invention has been particularly shown and described with reference to a preferred embodiment thereof, it will be understood by those skilled in the art that various changes in form and details may be made therein without departing from the spirit and scope of the invention.

What is claimed is:

1. In a memory, a plurality of thick magnetic films having uniaxial anisotropic characteristics and wherein the inherent demagnetization force exceeds the inherent coercive force, means for storing binary information in said magnetic films, said storing means including means for saturating particular ones of said magnetic film to register a first binary quantity, a second binary quantity being defined by a magnetic film being in an unsaturated condition, and means for reading binary information from said memory.

2. In a memory as defined in claim 1 wherein said reading means includes additional means for sensing domain rotation in each of said magnetic films.

3. A system comprising a plurality of magnetic structures having uniaxial anisotropic characteristics such as to provide an "easy" axis and a "hard" axis of magnetization, said magnetic structures having an inherent demagnetization force in excess of the inherent coercive force, biasing means for saturating selected ones of said magnetic structures, means for applying driving fields to each of said magnetic structures, and means coupled to said magnetic structures for sensing domain rotation in said magnetic structures upon application of said driving fields.

4. In a system as defined in claim 3 wherein said applying means is operative to apply said driving field transverse to the "easy" axis of each of said magnetic structures.

5. In a system as defined in claim 3 wherein said biasing means includes means for applying a magnetic field transverse to the "easy" axis of said selected ones of said magnetic structures.

6. A read-only memory comprising a plurality of magnetic films having uniaxial anisotropic characteristics such as to provide an "easy" axis and a "hard" axis of magnetization, said magnetic films having an inherent demagnetization force in excess of the inherent coercive force such that said magnetic films disassociate into multiple domains aligned in parallel but opposite direction along said "easy" axis, biasing means for saturating selected ones of said magnetic films to register binary information in said memory, readout means coupled one to each of said magnetic films and responsive to domain rotation therein, and means for applying driving fields transverse to the "easy" axis of each of said magnetic films to effect domain rotation therein.

7. A read-only memory as defined in claim 6 wherein said biasing means includes means for applying a magnetic field transverse to the "easy" axis of said selected ones of said magnetic films.

8. A read-only memory as defined in claim 6 wherein said biasing means includes permanent magnet means corresponding one to each of said selected magnetic films.

9. A memory comprising a plurality of magnetic films having uniaxial anisotropic characteristics such as to provide an "easy" axis and a "hard" axis of magnetization, said magnetic films having an inherent demagnetization force in excess of the inherent coercive force, said magnetic films being arranged in predetermined groups to define a number of word addresses, biasing means for saturating selected ones of said magnetic films in each of said groups to register binary information, sensing means coupled to corresponding magnetic films in each of said groups, and means for applying driving fields to said magnetic films in a predetermined one of said groups.

10. In a memory as defined in claim 9 wherein said last-mentioned means is operative to apply said driving fields transverse to said "easy" axis of said magnetic films in said predetermined one of said groups.

11. In a memory as defined in claim 9 wherein said biasing means includes means for applying magnetic fields transverse to the "easy" axis of said selected magnetic films in said predetermined groups.

12. A read-only memory comprising a plurality of thick magnetic films having uniaxial anisotropic characteristics such as to provide an "easy" axis and a "hard" axis of magnetization, a thick magnetic film being defined as one wherein demagnetization force exceeds coercive force so as to disassociate into multiple domains normally aligned in parallel but opposite directions along said "easy" axis to define a first binary state, biasing means for saturating selected ones of said magnetic films to define a second binary state, means coupled to each of said magnetic films for sensing the rotation of domains along said "hard" axis, and readout means for applying an external field transverse to said "easy" axis of each of said magnetic films whereby rotation of domains is effected only in unsaturated ones of said magnetic films.

13. In a read-only memory as defined in claim 12 wherein said biasing means is operative to saturate so as to align multiple domains in said selected magnetic films along said "hard" axis.

14. A read-only memory comprising a plurality of thick magnetic films having uniaxial anisotropic characteristics such as to provide an "easy" axis and a "hard" axis of magnetization, a thick magnetic film being defined as one wherein demagnetization force exceeds coercive force so as to disassociate into multiple domains aligned in parallel but opposite directions along said "easy" axis, means for sensing domain rotation in each of said magnetic films, means for applying a driving field transverse to said "easy" axis of said magnetic films of sufficient magnitude to overcome said demagnetization force and anisotropic force so as to effect domain rotation in said magnetic films whereby said demagnetization and said anisotropic forces are increased and accelerate reorientation of multiple domains along said "easy" axis upon cessation of said driving field, and means for inhibiting domain rotation in selected ones of said magnetic films.

15. In a read-only memory as defined in claim 14 wherein said last-mentioned means includes means for applying a biasing field transverse to said "easy" axis of selected ones of said magnetic films at least sufficient to overcome said demagnetizing force and said coercive force whereby multiple domains in said selected magnetic films are aligned along said "hard" axis.

16. A read-only memory comprising a plurality of thick magnetic films having uniaxial anisotropic characteristics such as to provide an "easy" axis and a "hard" axis of magnetization, a thick magnetic film being defined as one wherein demagnetization force exceeds coercive force such that said film disassociates into multiple domains aligned in parallel but opposite directions along said "easy" axis, said plurality of magnetic films being arranged in predetermined groups to define a plurality of word addresses, information write-in means for biasing selected ones of said magnetic films so as to align multiple domains therein along said "hard" axis and defines a first binary state, a second binary state being defined by the alignment of multiple domains along said "easy" axis in said magnetic films, sensing means responsive to domain rotation coupled to corresponding ones of said magnetic films in each of said predetermined groups, and a plurality of readout means for applying driving fields transverse to the "easy" axis of said magnetic films on a group basis such as to effect domain rotation toward said "hard" axis in said magnetic films whereby only said sensing means coupled to unselected ones of said magnetic films in a particular one of said groups are energized, and means for operating said readout means on an individual basis.

17. A read-only memory comprising a plurality of magnetic thick film structures having uniaxial anisotropic characteristics so as to provide an "easy" and a "hard" axis of magnetization and wherein the demagnetization force exceeds the coercive force to establish a multiple domain structure, said magnetic structures being arranged in predetermined rows and columns to define a memory array wherein the "easy" axis of said magnetic structures are aligned in a same direction, information write-in means including a plurality of flux producing means for saturating selected ones of said magnetic structures, information read-out means for applying a second magnetic field transverse to the "easy" axis of said magnetic structures in a selected one of said columns so as to rotate multiple domains in unselected ones of said magnetic structures toward said "hard" axis, and means coupled to corresponding ones of said magnetic structures in each of said columns for sensing domain rotation in said magnetic structures arranged in said selected column.

18. A read-only memory comprising a plurality of magnetic films having uniaxial anisotropic characteristics defining an "easy" axis and a "hard" axis of magnetization, anisotropic forces maintaining the magnetization of each of said magnetic films along said "easy" axis to define a first binary state, biasing means for saturating selected ones of said magnetic films to define a second binary state, readout means coupled to said magnetic films for sensing the component of flux change along said "hard" axis, and means for applying driving fields to said magnetic films at an angle to said "easy" axis whereby the magnetization of unselected ones of said magnetic films is rotated from said "easy" axis and information signals are induced along said readout means, said anisotropic forces effective to normalize the magnetization of said unselected magnetic elements along said "easy" axis upon termination of said driving fields.

19. A read-only memory as defined in claim 18 wherein said biasing means are operative to saturate said selected magnetic films along said "hard" axis.

20. A memory comprising a plurality of magnetic films having uniaxial anisotropic characteristics so as to define an "easy" axis and a "hard" axis of magnetization, anisotropic forces tending to maintain the magnetization of said magnetic films along said "easy" axis to define a first binary state, said magnetic films being arranged in predetermined groups defining a number of word addresses, biasing means for saturating selected ones of said magnetic films in said word addresses to define a second binary state, means coupled to corresponding magnetic films in each of said groups for sensing the component of flux change along said "hard" axis, and means for applying driving fields to said magnetic films in a predetermined one of said groups, said last-mentioned means being operative to apply said driving fields in a direction other than along said "easy" axis of said magnetic films.

21. A memory as defined in claim 20 wherein said "easy" axis of each of said magnetic films is oriented in a same direction.

22. In a memory, a plurality of thick magnetic films wherein the inherent demagnetization force of each of said films exceeds its inherent coercive force, means for storing binary information in said magnetic films, said storing means including means for saturating particular ones of said magnetic film to register a first binary quantity, a second binary quantity being defined by a magnetic film being in an unsaturated condition, and means for reading binary information from said memory.

23. In a memory, a plurality of thick magnetic films each having at least one anisotropic magnetic axis and wherein the inherent demagnetization force exceeds the inherent coercive force, means for storing binary information in said magnetic films, said storing means including means for saturating particular ones of said magnetic film to register a first binary quantity, a second binary quantity being defined by a magnetic film being in an unsaturated condition, and means for reading binary information from said memory.

24. In a memory, a plurality of thick magnetic films wherein the inherent demagnetization force of each of said films exceeds its inherent coercive force such that said magnetic films normally disassociate into multiple domains, readout means for applying driving fields to each of said magnetic films to rotate the magnetization of said domains therein, means for sensing the rotation of said domains in said magnetic films upon application of said driving fields, and means for storing binary information in said magnetic films, said storing means including means for biasing particular ones of said magnetic films to inhibit rotation of said domains therein upon application of said driving fields to register a first binary quantity, a second binary quantity being defined in others of said films wherein rotation of said domains is not inhibited.

25. In a memory, a plurality of thick magnetic films wherein the inherent demagnetization force exceeds the inherent coercive force such that said magnetic films normally disassociate into multiple domains, readout means for applying driving fields to said magnetic films along a given direction to rotate the magnetization of said domains therein, means for sensing the rotation of said domains in said magnetic films, and means for storing information in said magnetic films, said storing means including means for applying biasing fields along said given direction to particular ones of said magnetic films to inhibit rotation of said domains therein upon application of said driving fields to register a first binary quantity, a second binary quantity being defined in others of said films by said other films being in the normal multiple domain state.

26. The memory of claim 25 wherein said sensing means are inductively coupled to said magnetic films along said given direction.

27. In a memory, a plurality of thick magnetic films wherein the inherent demagnetization force exceeds the inherent coercive force such that said magnetic films normally disassociate into multiple domains, readout means for applying driving fields to each of said magnetic films in a given direction with respect to the magnetization of particular ones of said domains whereby the magnetization of said domains are rotated into the direction of said driving fields, sensing means responsive to the rotation of said domains in said magnetic films, and means for storing binary information in said magnetic films, said storing means including means for saturating particular ones of said magnetic films to inhibit rotation of said domains upon application of said driving fields to register a first binary quantity, a second quanity being defined by a magnetic film in an unsaturated condition.

28. The memory as defined in claim 27 wherein said sensing means are inductively coupled to said magnetic films to sense the rotation of said domains in said given direction.

29. In a memory, a plurality of thick magnetic films wherein the inherent demagnetization force exceeds the inherent coercive force such that such magnetic films normally disassociate into multiple domains, said magnetic films being arranged in predetermined groups to define a number of word addresses, readout means for applying driving fields to said magnetic films in each of said groups to rotate the magnetization of said multiple domains therein, and means for storing information in said magnetic films in each of said groups, said storing means including means for biasing selected ones of said magnetic films in each of said groups to inhibit rotation of said domains therein to register a first binary quantity, a second binary quantity being defined by a magnetic film wherein rotation of said domains is not inhibited, and sensing means coupled to corresponding magnetic films in each of said groups and responsive to rotation of said domains therein.

30. The memory as defined in claim 29 wherein said readout means are operative to apply said driving fields to said magnetic films in a given direction and said sense means are inductively coupled to said corresponding magnetic films to sense rotation of said domains therein in said given direction.

References Cited by the Examiner

UNITED STATES PATENTS 3,126,529 3/1964 Hempel ------------ 340—174

BERNARD KONICK, *Primary Examiner.*

E. LIEBERSTEIN, *Assistant Examiner.*